United States Patent
Barrios et al.

(10) Patent No.: US 8,597,434 B2
(45) Date of Patent: Dec. 3, 2013

(54) TOWED PORTABLE CLEANING STATION

(75) Inventors: Guillermo Morales Barrios, Nuevo Leon (MX); Hector Valdez Jaramillo, Nuevo Leon (MX); Gerardo Angel Gonzalez Chapa, Apodaca (MX); Roger Pedlar, Lakewood, CO (US)

(73) Assignee: Karcher North America, Inc., Englewood, CO (US)

( * ) Notice: Subject to any disclaimer, the term of this patent is extended or adjusted under 35 U.S.C. 154(b) by 721 days.

(21) Appl. No.: 12/762,977

(22) Filed: Apr. 19, 2010

(65) Prior Publication Data
US 2011/0253179 A1  Oct. 20, 2011

(51) Int. Cl.
*B60S 3/04* (2006.01)
*B60P 3/22* (2006.01)

(52) U.S. Cl.
USPC ....... 134/115 R; 134/123; 134/177; 239/130; 239/131; 239/147; 239/172

(58) Field of Classification Search
USPC ............. 134/115 R, 123, 177; 239/130–131, 239/147, 172
See application file for complete search history.

(56) References Cited

U.S. PATENT DOCUMENTS

| | | | |
|---|---|---|---|
| 1,602,105 A | 10/1926 | Geer et al. | |
| 2,765,997 A | 10/1956 | Motts | |
| 3,022,791 A * | 2/1962 | Larson | 134/70 |
| 3,064,486 A | 11/1962 | Aplin | |
| 3,179,117 A * | 4/1965 | Gibson et al. | 134/107 |
| 3,258,019 A * | 6/1966 | Bellas et al. | 134/99.2 |
| 3,444,867 A * | 5/1969 | Thornton | 134/123 |
| 3,652,044 A | 3/1972 | Manross | |
| 3,698,029 A * | 10/1972 | Pulliam | 15/88.3 |
| 3,734,540 A * | 5/1973 | Thiermann | 280/482 |
| 3,797,744 A * | 3/1974 | Smith | 239/172 |
| 3,810,544 A | 5/1974 | Armstrong et al. | |
| 3,831,849 A | 8/1974 | Studinger | |
| 3,834,657 A | 9/1974 | Freitas, Jr. | |
| 3,858,761 A | 1/1975 | O'Dell | |
| 3,908,941 A | 9/1975 | Bromley et al. | |

(Continued)

FOREIGN PATENT DOCUMENTS

| CA | 2298122 | 7/2001 |
|---|---|---|
| JP | 59-069189 | 4/1984 |

(Continued)

OTHER PUBLICATIONS

"Washwater treatment ElectroPulse Technology", Oil Trap Inc., Recycling Product News, Jul.-Aug. 2005, p. 1.

(Continued)

*Primary Examiner* — Arlen Soderquist
(74) *Attorney, Agent, or Firm* — Sheridan Ross P.C.

(57) ABSTRACT

A device and method of use for a towed portable cleaning facility is disclosed. The device employs storage tanks for both the storage and transport of cleaning fluids. The tanks serve the additional function of surrounding and enclosing the cleaning area an area that may be used for cleaning or storage. By utilizing the tanks as walls, the present invention provides a portable cleaning station. The device may further include the ability to treat and clean used fluids in order to either reuse or safely dispose of the used fluids as well as the ability to recover heat energy from an engine compartment to heat cleaning fluids.

43 Claims, 8 Drawing Sheets

(56) References Cited

U.S. PATENT DOCUMENTS

| | | | |
|---|---|---|---|
| 3,923,658 A | 12/1975 | Lancaster | |
| 4,104,164 A | 8/1978 | Chelton | |
| 4,120,210 A | 10/1978 | Sloyan | |
| 4,246,982 A | 1/1981 | Pretnick | |
| 4,279,263 A * | 7/1981 | Pulliam | 134/111 |
| 4,306,967 A | 12/1981 | Trautwein | |
| D263,037 S | 2/1982 | Brown | |
| 4,355,834 A | 10/1982 | Alford | |
| 4,367,145 A | 1/1983 | Simpson et al. | |
| 4,431,548 A | 2/1984 | Lipowski et al. | |
| D276,902 S | 12/1984 | Plugge | |
| 4,561,624 A | 12/1985 | Freeman | |
| 4,652,368 A | 3/1987 | Ennis et al. | |
| 4,792,274 A | 12/1988 | Cockram | |
| 4,807,319 A * | 2/1989 | Poitevin | 15/88.3 |
| 4,821,958 A * | 4/1989 | Shaffer | 239/131 |
| 4,981,318 A * | 1/1991 | Doane et al. | 296/182.1 |
| 5,031,602 A | 7/1991 | Vick | |
| 5,033,489 A * | 7/1991 | Ferre et al. | 134/57 R |
| D329,996 S | 10/1992 | Ciszewski | |
| 5,286,302 A | 2/1994 | Wickham, III | |
| 5,413,128 A | 5/1995 | Butts | |
| 5,445,730 A | 8/1995 | Pattee | |
| 5,462,330 A * | 10/1995 | Brown | 296/172 |
| 5,498,329 A | 3/1996 | Lamminen et al. | |
| 5,601,659 A | 2/1997 | Rohrbacher | |
| 5,611,487 A | 3/1997 | Hood | |
| 5,695,121 A | 12/1997 | Stillions, Jr. et al. | |
| 5,746,904 A | 5/1998 | Lee | |
| 5,833,295 A | 11/1998 | Farlow, Jr. | |
| 5,908,550 A | 6/1999 | Kaipainen | |
| 5,958,240 A | 9/1999 | Hoel | |
| 5,975,480 A | 11/1999 | Schaefer et al. | |
| 6,021,792 A | 2/2000 | Petter et al. | |
| 6,042,702 A | 3/2000 | Kolouch et al. | |
| 6,106,712 A | 8/2000 | New | |
| 6,132,509 A | 10/2000 | Kuschnereit | |
| 6,132,599 A | 10/2000 | Chaffee | |
| 6,234,408 B1 | 5/2001 | Stevens et al. | |
| 6,234,409 B1 | 5/2001 | Aslakson | |
| 6,301,848 B1 | 10/2001 | Whitaker | |
| 6,346,197 B1 | 2/2002 | Stephenson et al. | |
| 6,349,715 B1 | 2/2002 | McBroom | |
| 6,416,101 B1 | 7/2002 | Bartch | |
| 6,427,707 B1 * | 8/2002 | Morris | 134/72 |
| 6,495,048 B2 | 12/2002 | Stephenson et al. | |
| 6,550,692 B1 | 4/2003 | Schacht | |
| 6,568,411 B1 * | 5/2003 | Staples et al. | 134/123 |
| 6,575,858 B2 | 6/2003 | Green et al. | |
| 6,641,721 B2 | 11/2003 | Mulierheim | |
| 6,655,396 B2 | 12/2003 | Krenzel | |
| 6,663,783 B2 | 12/2003 | Stephenson et al. | |
| 6,715,517 B2 | 4/2004 | Tobin | |
| 6,766,822 B2 | 7/2004 | Walker | |
| 6,790,349 B1 | 9/2004 | Sawyer | |
| 6,799,591 B2 | 10/2004 | McCormick et al. | |
| 6,932,412 B1 | 8/2005 | Paproski | |
| D510,545 S | 10/2005 | Riegel et al. | |
| 6,964,820 B2 | 11/2005 | Shimonosono et al. | |
| 7,066,096 B1 | 6/2006 | Harker et al. | |
| 7,118,633 B2 | 10/2006 | Jenkins | |
| 7,121,288 B2 | 10/2006 | Jenkins | |
| 7,160,472 B2 | 1/2007 | Van Vliet et al. | |
| 7,203,979 B2 | 4/2007 | O'Brien | |
| 7,258,749 B2 | 8/2007 | McCormick et al. | |
| 7,264,178 B1 * | 9/2007 | Hugg | 239/129 |
| D555,303 S | 11/2007 | Taylor et al. | |
| D566,624 S | 4/2008 | Dempsey et al. | |
| D572,212 S | 7/2008 | Taylor et al. | |
| 7,431,835 B2 | 10/2008 | Lack | |
| 7,530,362 B2 | 5/2009 | McCormick et al. | |
| D626,461 S * | 11/2010 | Barrios et al. | D12/101 |
| 8,240,732 B2 * | 8/2012 | Bernart | 296/37.1 |
| 2002/0153747 A1 * | 10/2002 | Ropp | 296/181 |
| 2003/0041407 A1 * | 3/2003 | Savage | 15/321 |
| 2005/0066997 A1 * | 3/2005 | Watford | 134/10 |
| 2006/0118149 A1 | 6/2006 | Benson et al. | |
| 2006/0157094 A1 | 7/2006 | Zeile | |
| 2006/0273622 A1 | 12/2006 | Laird | |
| 2007/0056510 A1 | 3/2007 | Antaya | |
| 2007/0199868 A1 | 8/2007 | Volpe | |
| 2008/0000507 A1 | 1/2008 | Snyder et al. | |
| 2009/0025759 A1 * | 1/2009 | Kotze | 134/95.2 |
| 2009/0062046 A1 | 3/2009 | Lindemann | |
| 2009/0065442 A1 | 3/2009 | Taylor et al. | |
| 2009/0188535 A1 | 7/2009 | Taylor et al. | |
| 2010/0044462 A1 * | 2/2010 | Hugg | 239/172 |

FOREIGN PATENT DOCUMENTS

| | | |
|---|---|---|
| JP | 10-297440 | 11/1998 |
| JP | 2004-066037 | 3/2004 |
| WO | WO 2006/060856 | 6/2006 |

OTHER PUBLICATIONS

"Danron Enterprises Electro-Coagulation Treatment (ECT) System Performance Claim", Environmental Technology Verification (ETV) Program website, as early as Mar. 2006, available at http://www,etvcanada.ca/F/data/PDF_Danron.pdf, pp. 1-2, printed on Apr. 6, 2007.

Diterlizzi, "Introduction to Coagulation and Flocculation of Wastewater", Term Project/Environmental Systems Project, Fall 1994, available at http://www.rpi.edu/dept/chem-eng/Biotech-Environ/COAG/coag. Htm, pp. 1-4, printed on Apr. 6, 2007.

"Hydropad Portable Wash Pad: Hydropads have the following features:", ecosentry website, as early as 2005, available at http://www.ecosentry.com.au/hydropad, pp. 1-3, printed on Aug. 10, 2006.

"Hydropad Portable Wash Pad", HE HYDROengineering website, as early as 2004, available at http://www.hydroblaster.com/HydropadPortableWashRack,html, pp. 1-11, printed on Aug. 10, 2006.

"Applications: The Drive-On Wash Pad—design your own wash pad", EZ Environmental Solutions Corporation website, date unknown, available at http://www.ezenvironmental.com/productasp?page=1224, pp. 1-3, printed on Aug. 10, 2006.

"Cyclonator: Pumping & Polution Control Solutions", Megator website, as early as Dec. 12, 2004, available at http://www.megator.com/cyclonator.htm, pp. 1-2, printed on Aug. 10, 2006.

* cited by examiner

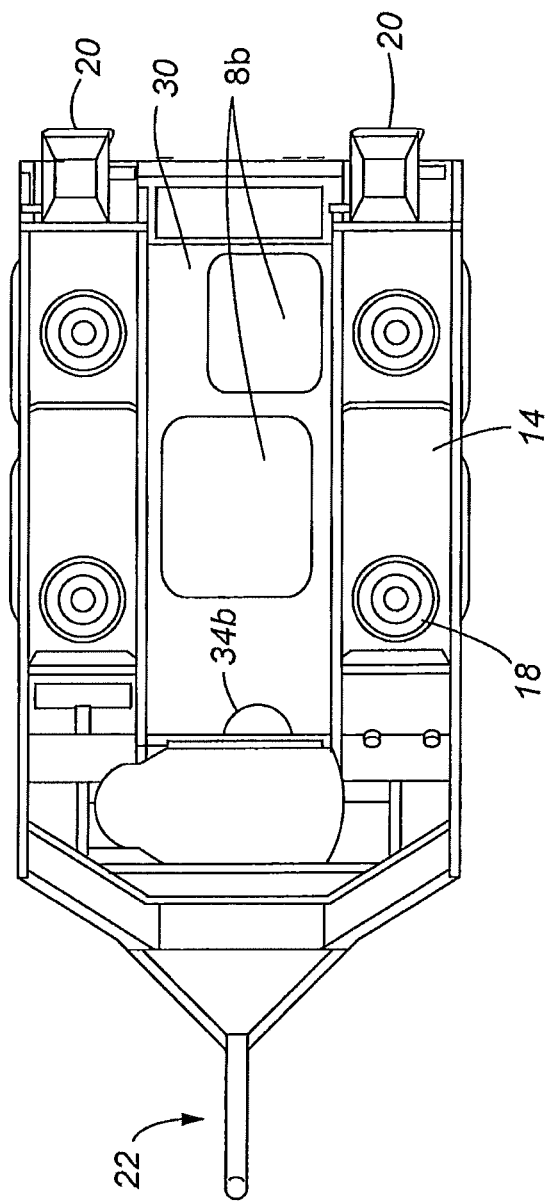

TOWED PORTABLE CLEANING STATION

CROSS-REFERENCE TO RELATED APPLICATIONS

The subject matter of the present application is related to the following applications: application Ser. No. 12/480,515 filed Jun. 8, 2009 entitled "Immediate Cleaning and Recirculation of Cleaning Fluid and Method of Using Same"; application Ser. No. 12/730,066 filed Mar. 23, 2010 entitled "Compact Radiator-Based Heat Exchanger"; and application Ser. No. 12/730,075 filed Mar. 23, 2010 entitled "Automatic Belt Tensioning System." Each of these applications is incorporated by reference in its entirety as if stated herein. All of these applications are commonly owned by the Assignee.

FIELD OF THE INVENTION

The field of the present disclosure is directed to mobile cleaning systems. More particularly the present disclosure is directed to a method and system for containing, transporting, collecting, and treating fluids, where the fluids are contained within tanks or storage units that also operate as the surrounding structure of a work or storage space contained on or within a towed device.

BACKGROUND OF THE INVENTION

It is often desirable to employ a transportable cleaning or work station which provides cleaning fluids and resources, as well as a workspace and/or storage space that facilitates the containment and collection of spent cleaning fluids and wastewater. For example, U.S. Pat. No. 7,066,096 to Harker et al., which is incorporated by reference in its entirety, discloses a portable cleaning apparatus that attaches to a trailer. However, Harker et al. fails to teach a system with a defined workspace and/or storage space that allows for the containment of cleaning fluids as they are sprayed or dispensed in a cleaning operation. Harker et al. also fails to teach an apparatus which conveniently stores both clean and soiled fluids in tanks which also operate to surround a workspace or storage space.

U.S. Pat. No. 6,132,509 to Kuschnereit discloses a self-contained, trailer-mounted, portable wash and paint facility. U.S. Pat. No. 6,234,408 to Stevens et al. discloses a mobile fireproofing and coating apparatus with a work platform mounted on the unit. Kuschnereit and Stevens et al. fail to teach, however, a device where the containment or storage tanks for working fluids also function as work-space or storage space walls or housings. These patents are also incorporated by this reference in their entireties.

Furthermore, it is often desirable in cleaning operations to contain waste fluids from washing activities and to treat those fluids for appropriate disposal, recycling and/or possible reuse in subsequent cleaning operations. U.S. patent application Ser. No. 12/032,562 filed on Feb. 15, 2008 and U.S. Patent Publication No. 2009-0065442-A1, both of which are incorporated by reference herein in their entireties, include some of these characteristics. However, these and similar systems delay treatment of spent fluid and are inefficient in treating and recycling the waste fluids and/or greywater. Applicant's previously filed U.S. patent application Ser. No. 12/480,515, which does not teach the use of storage tanks which double as trailer walls, discloses a wash and waste fluid treatment system which address these concerns and is hereby incorporated by this reference in its entirety.

Accordingly, there has been a long-felt and unmet need for a towed portable cleaning station with a fluid storage means, which storage means also functions as the surrounding structure of a cleaning station. The following disclosure describes a towed cleaning station that employs a novel combination of features that address these long felt needs.

SUMMARY OF THE INVENTION

According to various embodiments of the present disclosure, a towable wash station and fluid containment system is disclosed. The system comprises one or more tanks or storage containers that operate to both house and transport used and unused wash fluids, as well as provide a surrounding structure within which items can be securely housed and transported and/or wash fluids, a user of the system, and objects to be cleaned may be partially or fully enclosed. It will be recognized that objects of the present invention may be served by a structure that wholly surrounds objects being transported and/or a user and wash area, as well as a structure that comprises housing or spray-back shelter in the form of only a single boundary or wall. For the purposes of the present invention, "enclosed" thus refers to both fully enclosed as well as partially enclosed structures.

The system further comprises a device as previously described that is mounted or situated upon a towed object. It will be recognized that the advantages provided by employing a towed vehicle, including the ability to transport the cleaning device to various locations for cleaning purposes, may be obtained by a variety of known towed devices. Therefore, the present invention is not limited to towed devices that necessarily include wheels. Rather, towed devices that utilize wheels, skis, runners, rail equipment, and other devices to allow for ease of movement are contemplated by the present invention. It will also be recognized that where reference is made to a plurality of devices that aid in towing (e.g. wheels, skis, or runners, etc.), the present invention contemplates the use of as few as one of these devices.

In one embodiment, the system further comprises a method for circulating one or more spent fluids to a treatment apparatus of the system. From there, these treated fluids may be deposited into a holding tank for use in a cleaning process or into a waste holding tank for future disposal.

The system in varying embodiments also comprises one or more pumps for pressure washing or otherwise dispensing fluids during cleaning operations and for flushing varying degrees of dirty fluids from the system, recirculating one or more cleaning fluids to varying parts of the system, and further facilitates the transfer and use of reclaimed spent fluid for either further treatment, disposal or subsequent appropriate use throughout the system. A description of pump and recirculation systems and methods known in the art and suitable for use with disclosed devices are included in U.S. Pat. Nos. 6,964,820, 6,766,822, 6,715,517, 6,132,599 and 4,306,967, which are all incorporated by this reference herein in their entireties.

In operation, the system will pressurize cleaning fluids, supplying those fluids, which may or may not be heated, to disbursing hose and then to an outlet mechanism, such as a lance wand. The cleaning fluid could be sprayed onto items situated inside the cleaning trailer or onto items located outside the trailer. The spent fluid could be captured, if expended inside the trailer, by a drain system. If expended outside the trailer, the spent fluid could be collected in any known fashion, such as by use of a wet vacuum and/or through manual collection The system and process described herein further provides a device and method for a portable cleaning station that is capable of continuously removing contaminants from spent cleaning fluid, treating that waste fluid, and storing the fluids. That treated fluid may be reused in the cleaning system, stored, or safely discharged into the environment.

According to another embodiment, the waste fluid is transported through a purification apparatus associated with the overall device. Depending on the precise system configuration, these apparatus could include one, several or all of the following subsystems: pre-treatment system to remove debris and certain heavy solids; treatment by methods and systems such as a conductivity solution injection system and/or electrolytic coagulation system, a polymer injection system, and a inline mixer for mixing the polymer in the wastewater stream; and an ozone or other oxidizing gas injection treatment system.

In one other embodiment, each of the treatment sections of the overall device are contained within an enclosure cabinet that includes a controller and/or control panels, as well as, feed containers to hold the conductivity fluid, polymer, oxidizing gasses, etc. As will be explained, the cabinet can act as a wall of the trailer, similar to how the fluid tanks act as trailer walls.

In another embodiment of the present device, one or more heat exchangers may be utilized. In one embodiment, a pre-heat heat exchanger can make advantageous use of waste heat from an engine, pump or other heat generating device. Specifically, that waste heat can be used to pre-heat or heat a continuous supply of fluid for use in cleaning operations. For example, a device may be employed, as will be described, which causes heat from the emissions of an engine to interact with fluid to be used in cleaning operations. Such an embodiment advantageously utilizes energy in the form of heat that would otherwise be discarded to increase the temperature of wash fluids and thus increase the overall functionality of the entire device. In one embodiment of the system the described heat exchanger facilitating pre-heating of a fluid will be further heated by a primary heat exchanger system. In another embodiment of the system, the disclosed heat exchanger may be used as a primary fluid heating source.

In another embodiment, a manually adjustable belt tensioning system may be employed in the overall device to maintain a substantially constant desired tension in a drive belt that is in force transmitting communication with an engine and a driven device (e.g., a pressure washer) which may be used in the overall system. The tensioning system comprises a biasing member, such as a spring, which is capable of applying either a substantially constant or non-constant force to a driven device and thus opposes the force of tension applied by a drive belt to that system, reducing complications resulting from slack forming in the drive belt. The tensioning system facilitates more efficient and longer periods of operation than may otherwise be achieved. The tensioning system further comprises a manually adjustable component, such as a handle, which allows a user to compress or expand the biasing member and thereby adjust the position of the driven device and/or the amount of force applied by the biasing member to the driven device.

In yet another embodiment, the disclosed device includes a portable cleaning station that is capable of continuously removing contaminants from spent cleaning fluid, treating that waste fluid, storing the fluids, heating the fluids at one or more stages with a heat exchanger that may utilize waste heat from an engine, and further includes a manually operable belt tensioning system to maintain a substantially constant desired tension in a drive belt.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

BRIEF DESCRIPTION OF THE DRAWINGS

The accompanying drawings, which are incorporated in and constitute part of the specification, illustrate embodiments of the invention and together with the general description of the invention given above and the detailed description of the drawings given below, serve to explain the principle of these inventions.

FIG. 2b is a top view of a towed portable cleaning apparatus and storage area.

Figure 1:
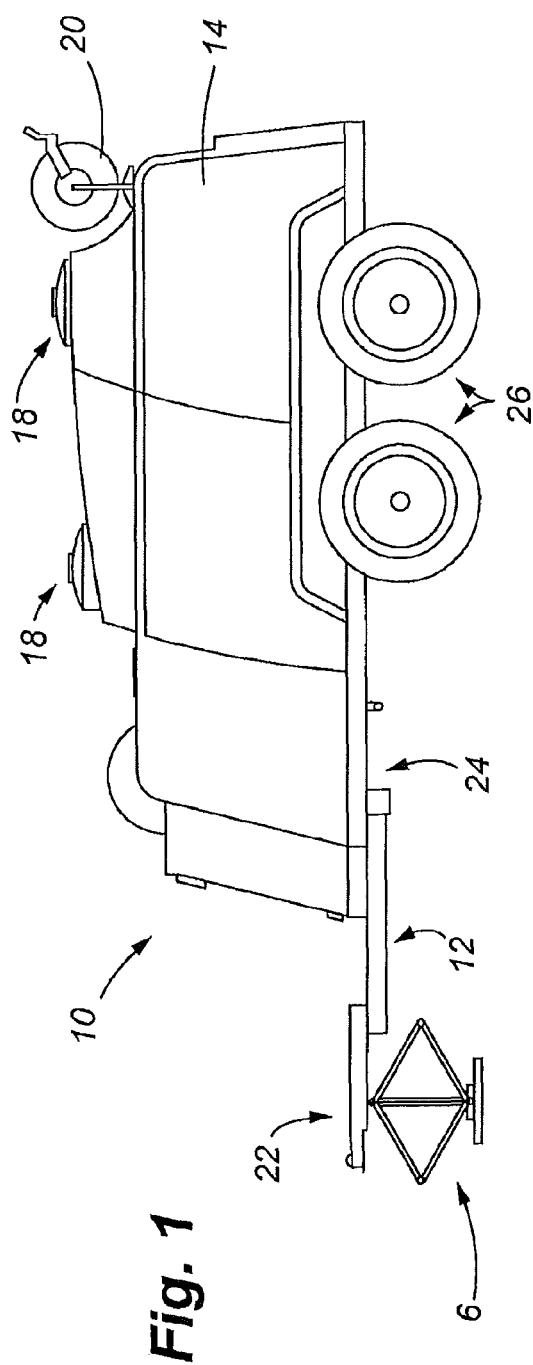
FIG. 1 is an elevation view of one embodiment of a towed portable cleaning apparatus and workstation.

To assist in the understanding of one embodiment of the present invention, the following list of components and associated numbering found in the drawings is provided:

| Ref. # | Component |
|---|---|
| 6 | Jack |
| 8a | Object to be cleaned |
| 8b | Objects residing on invention |
| 10 | Towed portable cleaning apparatus (generally) |
| 12 | Towed Device |
| 14 | Storage tank walls |
| 18 | Storage tank walls aperture |
| 22 | Trailer tongue |
| 24 | Trailer frame |
| 26 | Wheels |

-continued

| Ref. # | Component |
| --- | --- |
| 28 | Hoses |
| 30 | Enclosed area |
| 32 | Object to be cleaned |
| 34a | Drain |
| 34b | Heat Exchanger |
| 36 | Engine |
| 37 | Belt |
| 38 | Door/Hatch |
| 40 | Pump |
| 41 | Handle |
| 42-88 | Process Steps |
| 90 | Heat recovery device |
| 94 | Fluid inlet |
| 98 | Fluid outlet |
| 102 | Exhaust piping |
| 104 | Exhaust inlet |
| 106 | Exhaust outlet |
| 110 | Hose |
| 114 | Hose |
| 118 | Sump |
| 122 | Sludge Tank/Separator |
| 130 | Pipe |
| 138 | Wash Pad Sections |
| 142 | Central Trench |
| 150 | Pressure Washer |
| 154 | Water Treatment System |
| 158 | Cabinet |
| 160 | Door(s) |
| 162 | Side Panels |
| 166 | Upper Door(s) |
| 170 | Upper Door(s) |

It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

DETAILED DESCRIPTION

Varying embodiments of the present disclosure are described herein with reference to the drawings. It is expressly understood that although FIGS. 1-8 depict a towed portable cleaning station with storage units operable as walls or workstation surroundings, the present invention is not limited to these embodiments.

Referring now to FIGS. 1 and 2, one embodiment of the present invention 10 is shown wherein the walls 14 of a portable workstation cleaning apparatus 30 10 are comprised of storage tanks 14 that are further utilized to store and transport cleaning fluids. One of ordinary skill in the art will recognize that these tanks 14 may be formed of a variety of suitable materials including, but not limited to rotationally molded plastics, steels, or other substances of sufficient structural integrity and anti-corrosive properties. It will also be recognized that these tanks 14 need not be of any specific number in order to achieve the objectives of the present invention. Accordingly, the walls of the device 10 may be comprised of a single storage tank, multiple storage tanks, or a single storage tank that is partitioned or divided into any number of sections. Also, the tanks can be of any suitable size, shape or geometry. For the purposes of the present disclosure, tanks generally refer to objects comprised of a substantially impermeable material that are capable of containing, storing, and/or transporting materials within an inner portion thereof. Materials capable of being contained, stored, and/or transported may be of a gaseous, liquid, or solid state.

The cleaning station and surrounding tanks typically reside upon a towed device 12, such as a conventional trailer with a tongue 22, frame 24, and wheels 26. One of ordinary skill in the art will recognize that the trailer 12 included in the present embodiment need not be of any specific form or design. The advantages provided by a device 12 that includes trailing or towing capabilities include the ability to easily transport the cleaning station 30 present invention 10 to various locations. Portability may be particularly desirable where the object(s) 8a to be cleaned is not easily transportable, when it is desirable to operate the cleaning station at a distance away from other operations, or where objects to be cleaned are necessarily external to the enclosed area 30.

Various trailers and tongues are known in the art that may serve the spirit of the present invention. Indeed, in one embodiment, the tongue 22 of the trailer may optionally employ a jack 6 or stand to enable the front end of the trailer 10 to be supported when it is not attached to a vehicle or towing device (not shown). The jack 6 or stand may be selectively adjustable to differing heights and therefore control the pitch or slope of the attached work enclosed space 30.

Figure 2A:
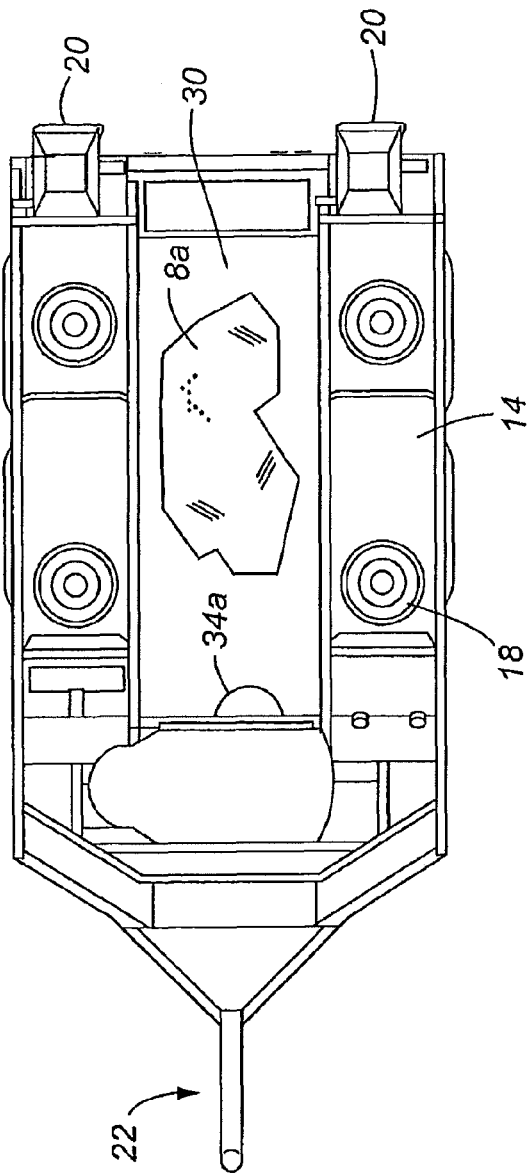
FIG. 2a is a top view of a towed portable cleaning apparatus and workstation.

FIG. 2a is a top view of one embodiment of the present invention 10 depicting the work-space 30 that is contained within the fluid storage tanks 14. FIG. 2a also depicts a drain or collection point 34a for spent fluids. In a preferred embodiment, the floor or base of the workstation 30 is comprised of a corrosion-resistant material, such as diamond-plate, and is sloped or tapered to facilitate the drainage and collection of spent fluids at a single downstream drain location 34. One of ordinary skill in the art will recognize that the drain 34a need not be located in any particular location in order to achieve the stated objective. So long as the drain 34a is positioned at the point of lowest gravitational potential energy on the work space 30, spent or used fluids will be allowed to collect at a common point under the force of gravity. In another embodiment of the present invention, a mesh or grated floor is employed in the workspace 30 such that no single drain location is relied upon. For example, a wire grate floor may be utilized to provide the base of a cleaning and work platform through which fluids are allowed to drain to a catch basin located beneath the workspace 30.

One advantage of the present invention is the recollection of spent or dirty fluids for the purposes of recycling or capturing for proper disposal. It will thus be recognized that it is desirable to construct the floor or base of the work station in such a manner so as to capture and collect the maximal amount of spent fluids. Further to this objective, the storage tanks for both used and unused fluids 14 operate as containment walls for the work space 30. In a preferred embodiment, these tanks 14 are constructed of a sufficient height to provide an adequate volume of fluid storage, as well as the necessary degree of splash or spray-back protection to prevent or minimize the amount of cleaning fluid that is lost to an outside environment.

The storage tanks or walls 14 are preferably equipped with at least one aperture 18 that is accessible to a user. These apertures 18 allow for input and extraction of fluids when, for example, the tanks 14 need to be filled prior to initiation of cleaning operations or fluids need to be replaced. Additionally, in a preferred embodiment, the apertures 18 are sufficiently large to allow for venting of the tanks 14 and access for cleaning of tank interiors.

One of skill in the art will recognize that various combinations of tanks, walls, and wash fluid cleaning devices may be employed to surround the enclosed work area 30. For example, a single wall of the work area 30 may be comprised of any number of combinations of storage tanks, basic wall structures, and/or a cabinets containing wash fluid cleaning equipment. Obviously, the present invention is not confined to a device wherein a wall or walls of a work area 30 are comprised of a single structure. Various devices as described herein may be stacked or arranged in series to form a surrounding structure of a work area 30. Also, a roof may be applied to the structure.

FIG. 2b depicts another embodiment of the present invention wherein the enclosed area 30 comprises a storage area. For example, an embodiment of the present invention may comprise a portable cleaning device wherein objects to be cleaned are located outside of the enclosed area 30. Various objects to be cleaned using this embodiment include, but are not limited to, sidewalks, various fixed objects, buildings, vehicles, and paved areas. Accordingly enclosed area 30 may comprise a storage area for various devices 8b, such as various cleaning supplies, cleaning devices such as pressure washers and vacuums, and debris may all be stored within enclosed area 30 for transportation and/or temporary storage. Storage, transportation, and securing of these objects 8b may be further aided by a door or enclosure means (38 in FIG. 6) to prevent unwanted displacement of these objects 8b. In one embodiment, door 38 may be hinged at a bottom portion so that it may further operate as a ramp in an open position, thus facilitating insertion and removal of objects 8b, and an enclosure in a closed position.

In applications where objects to be cleaned reside external to the present invention, the use of various devices is contemplated to recover the spent fluid used in cleaning. For example, one or more vacuum pumps may be utilized to recollect fluid spent during cleaning. Vacuum pumps which are integrated into various portions of the cleaning device, as described herein, may be utilized for this purpose. Alternatively, vacuum pumps independent of the disclosed device, including but not limited to those which may be transported within enclosed area 30 may be employed to recover fluids.

Figure 3:
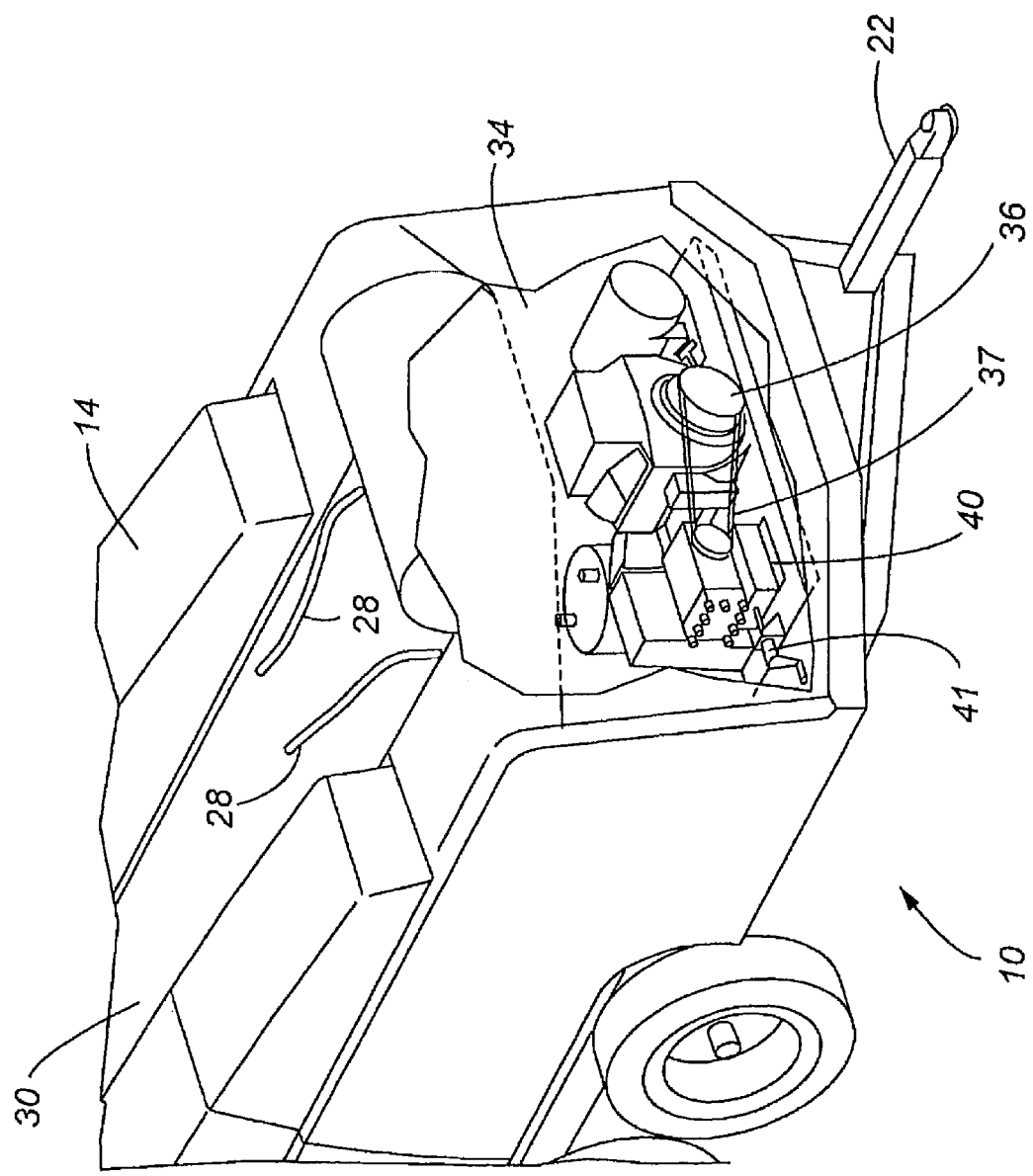
FIG. 3 is a perspective view of a towed portable cleaning apparatus and workstation depicting one embodiment of the present invention.

FIG. 3 is a perspective view of a pump and engine housing 34 according to one embodiment of the disclosed device. The engine 36 and pump 40 serve to deliver fluids to devices used in cleaning processes, as well as to facilitate recollection and storage of used fluids. In a preferred embodiment, the disclosed device 10 includes plumbing and pumps to deliver cleaning fluids from one or more tanks 14 containing unused fluids to the work enclosed area 30. Additionally, once cleaning fluids have been used and allowed to collect in the previously disclosed drain 34, an energy source 36 and a pump or compressor 40 may be employed to transmit the used fluids into one or more storage tanks 14 or otherwise discard, dispense or recycle the fluid.

In one embodiment, an engine 36, such as a conventional gas powered engine, is employed to drive various devices 40 such as fluid pumps, vacuum pumps, and compressors. While the previously described work enclosed space 30 and drain 34 allow for the collection of used fluids in a common location, it may still be necessary to further transport these fluids to storage tanks 14. The transport is accomplished through the previously described engine 36 and pump 40 or similar devices. Those working in the art will recognize that various engines or motors may be employed to achieve this object.

In another embodiment, the disclosed device utilizes novel features to maintain substantially continuous operation of the pump 40 and engine 36. These novel features are described in U.S. patent application Ser. No. 12/730,075. Specifically, a belt tensioning system employing at least one moving device and at least one biasing member, such as a spring, are employed to maintain a substantially constant desired tension on a drive belt 37 that is in force transmitting communication between the engine 36 and the pump 40. Furthermore, a manually operable adjustment 41 is provided which serves to compress the biasing member (not shown) when it is desirable to either pre-set, load, or unload the tension in a drive belt 37. The belt tensioning system thus allows for a substantially constant desired tension to be maintained on a drive belt 37, despite gradual elongation and strain of the drive belt 37 during operation. Maintaining this substantially constant tension allows for longer and more efficient periods of engine 36 and pump 40 run time with reduced need to adjust and/or replace used drive belts. When replacement or repair is required, the process is facilitated by the manually operable adjustment 41. Specifically, the tension in the biasing member can be quickly increased or decreased, enabling the repositioning of the pump 40 and/or engine 36, to facilitate removal and application of a new drive belt 37, and reapplication of biasing member compression prior to restarting the device.

Additionally, it is often necessary or desirable to pressurize cleaning fluids so that they may be dispensed under pressure during cleaning operations. Therefore, the disclosed device contemplates the use of the previously described engine 36 and corresponding pump 40, or alternatively an additional engine, to dispense and deliver stored cleaning fluids under pressure. Delivery of cleaning fluids may be further achieved by the use of conventional hoses 28 or nozzles.

In one embodiment, a plurality of hoses 28 resides on the device, through which the pump 40 and/or engine 36 delivers fluid. For example, one hose may deliver a solvent or cleaning fluid while another may serve to deliver clean water to the workspace 30. In this manner, a user may selectively determine which fluid is most appropriate for the particular application.

Alternatively, the device 10 may incorporate a single hose with user operated controls at a proximal end to dispense the desired fluid. For example, a nozzle attached to the hose may have various user controls so that one may select for the hose to deliver one of several desired fluids. Various devices of this type are presently known, such as "soda guns" used in the food and drink industry. The present invention also contemplates multiple hoses, each capable of dispensing multiple fluids. Such an embodiment would be desirable in situations where cross-contamination of hoses is a concern. An embodiment of the present invention includes accommodation means, such as a reel 20 as shown in FIG. 1, to secure and/or store various hoses.

As will be appreciated, the reel 20 could be manually or machine powered. Also, multiple hose reels could be included upon a single device 10. Further, any suitable device could be attached to the hose, specifically including a pistol-gripped cleaning wand with lance. Storage containers or other devices could be incorporated into device 10 to house tools designed to be attached to the fluid hoses.

Figure 4:
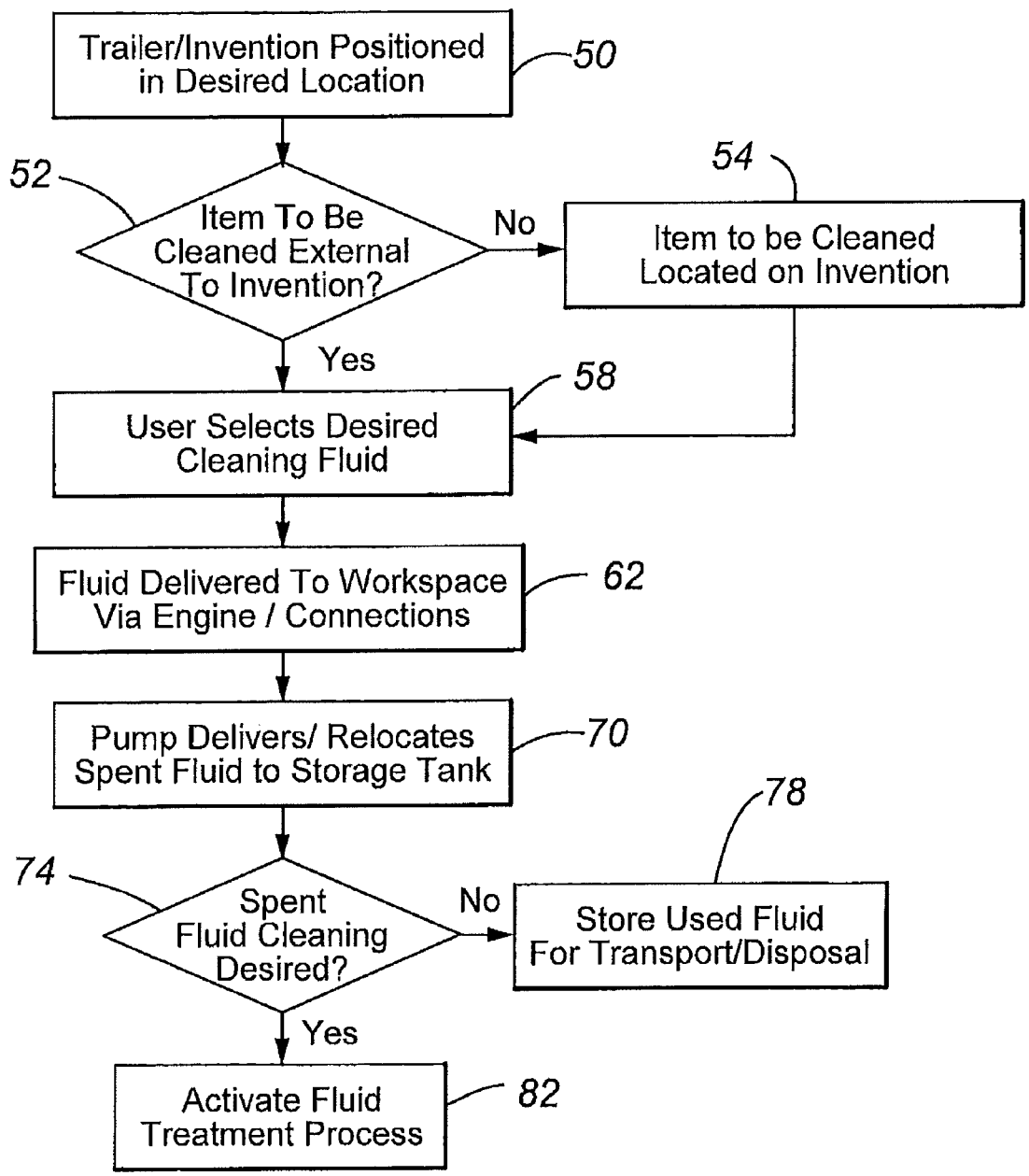
FIG. 4 is a flowchart depicting steps for using a towed portable cleaning apparatus and workstation in accordance with one described application of the disclosed device.

FIG. 4 is a flowchart describing the process by which fluids are transported through the present device and used for cleaning, according to one embodiment of the disclosed device. Process step 50 represents an initial step of positioning the device at a desired location to facilitate cleaning. It is often desirable to limit the required movement of an object in need of cleaning, either due to the mass of the object or to minimize the contamination that the object may impart on its surroundings during transport. Accordingly, a novel aspect of the present invention is the ability to position the cleaning station 10 proximal to the object to be cleaned with relative ease and quickness. However, it will be recognized that the present device is not limited to a system or method that requires relocation each time an object is cleaned. For example, the device may be transported to a job site or work area and remain substantially immobile there, thus providing cleaning facilities for the duration of a job or project.

Process step 54 further represents the process by which an item is located on or positioned within the device. While objects may be cleaned by the present invention without being located on the device, a preferred embodiment is represented whereby the object or objects to be cleaned are loaded or placed on the towed work area. The previously described walls or surrounding structure formed by the fluid tanks or other structures operate to prevent a significant amount of cleaning fluid, debris, or other waste to be lost and/or pollute the surrounding environment. Positioning the device to be cleaned on the towed enclosed work area further operates as a safety measure to reduce spray and other projectiles released during a cleaning operation that may strike or injure nearby persons or equipment. These safety features may be particularly advantageous in cleaning situations where wash fluids are applied or projected at high pressures, velocities, or volumes.

Process step 58 represents a user selection step whereby the user of the present device 10 determines which fluid is to be used for cleaning. Although the present device contemplates a work space that offers only a single fluid or solution for cleaning, one embodiment includes the storage or ability to connect to a plurality of fluids. For example, an embodiment of the present invention may include only one tank of unused fluid (e.g. water), a plurality of tanks that each house a different unused cleaning composition, a plurality of tanks that each house the same unused fluid for cleaning, a single tank housing unused fluid with the ability to connect to an outside source (e.g. water line), or a plurality of tanks housing unused fluid with the ability to connect to an outside water source.

Process step 62 represents the step by which the desired fluid is delivered or applied to the object to be cleaned. One of ordinary skill in the art will recognize various means by which stored fluids may be delivered to the desired cleaning area. For example, if fluids are desired to be delivered to the cleaning area under pressure, various pumps and nozzles known to one of ordinary skill in the art may be employed. A standard commercial pressure washer may be used to deliver the fluid or fluids from their storage location to the work area 30 and object to be cleaned 32. Alternatively, where delivery of fluids at high pressures is not required or desired, delivery of fluids may be accomplished purely by gravitational potential energy and/or hydrostatic pressure or through a user driven pump. For example, it is known in the art to use various riser hoses or drain hoses in order to extract liquid contents from a tank or container. Such devices may be employed in accordance with the present invention where a high pressure output of fluid is not needed or desired. Similarly, various hand pumps may be employed in the present invention. For example, U.S. Pat. No. 7,066,096 to Harker et al. discloses a hand pump that may be used to increase the air pressure inside of a container and thereby facilitate the dispensing or spraying of liquids. Similar features may be incorporated into the present invention to dispense cleaning fluids from their original location.

Process step 66 represents the process by which fluid is returned to a common collection point 34. The present invention further contemplates that drainage may be aided by the use of vacuum pumps that create a pressure differential to draw fluids into the common collection point. Various pumps are known in the art and, for the purposes of the present invention, include but are not limited to centrifugal pumps, axial flow pumps, small frame fluid pumps, medium frame fluid pumps, large frame fluid pumps, peristaltic pumps, reversible flow pumps, siphons such as gravity siphons, and sump pumps. Other pumping means are also contemplated for use with the present system and method.

Step 70 further depicts the process step whereby spent fluid and debris is relocated to additional storage tanks. In a preferred embodiment, tanks 14 for unused and used fluid additionally comprise the walls or borders of the towed work space 30. Accordingly, it is necessary to transmit at least some of the spent fluids to a point of higher potential energy after they have been drained or collected after washing operations. Therefore, in order to accomplish this transition, the present invention contemplates the use of one or more pumps. These pump(s) may be the same as the previously described drain pump(s) or may be additional pumps connected in series to the drain 34. For example, waste water and used fluids may be carried into the drain 34 and along pipes or pathways to ultimate storage locations or treatment stages by a series of axial pumps. Alternatively, the drain process described by step 66 may be accomplished purely by operation of gravity, the spent or used fluid allowed to collect in a common location, where one or more pumps may then transmit the drained fluid to another location. It will be recognized by one of ordinary skill in the art that the present invention is not confined to the preceding descriptions of particular embodiments. More specifically, it will be recognized that the transmission of used or unused fluids within, around, to, or from the device may be accomplished by numerous combinations of pumps and drainage features. It will further be recognized that the device is not confined to embodiments that incorporate a pump. While one embodiment of the device involves transmitting used fluids to locations of higher potential energy, thus necessitating energy input, it is also contemplated that drainage of fluid by purely gravitational means could be used with the device. For example, drainage of fluid to a point of lower elevation, such as an appropriately situated storage container beneath the workspace or to the outside environment, could be used to achieve gravitational fluid drainage.

Process step 74 depicts a decision block wherein a user may selectively determine whether or not cleaning, filtration or treatment of used and collected fluid is desired. In certain applications, it is not desirable or cost-effective to filter or treat used wash water or fluid. Accordingly, the present device contemplates providing users with the functionality to determine whether spent fluids are subjected to filtration and cleaning or merely stored. It will be recognized that this may be accomplished through a variety of means, including a bypass valve which may be selectively operated by a user to either direct spent fluids directly to storage containers or to stages of a cleaning and filtration process. Process step 78 represents subsequent storage of spent cleaning water or fluids. Fluids may be stored in the previously described storage tanks for later disposal or stored for future cleaning and/or recycling. Step 82 represents the activation of a fluid treatment and cleaning process whereby soiled wash water and fluid may be treated. Once treated, fluids may be immediately used for further cleaning operations in the device or stored indefinitely on the device or elsewhere.

Figure 5:
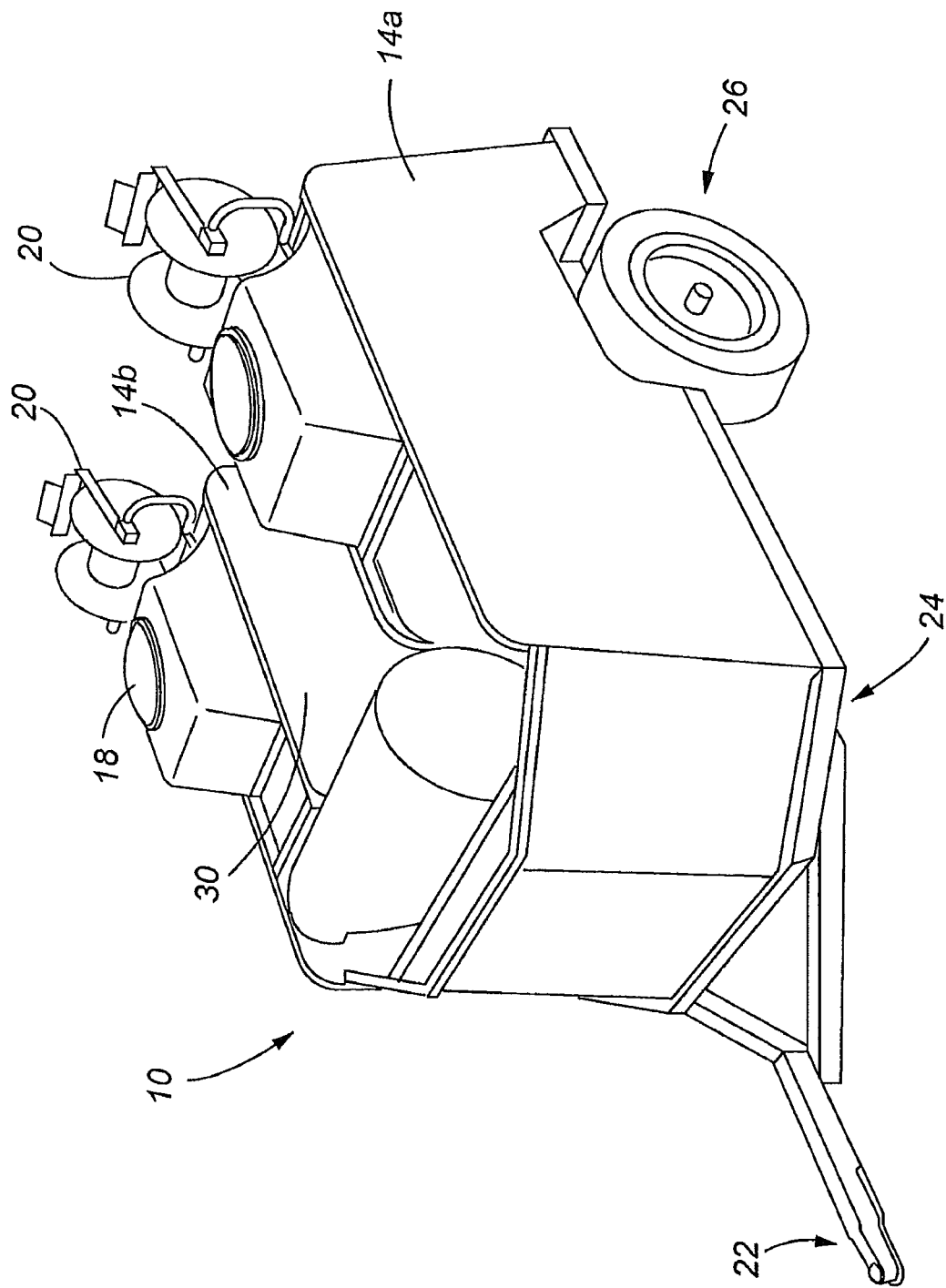
FIG. 5 is a perspective view of a towed portable cleaning apparatus and workstation depicting yet another embodiment of a disclosed device.

FIG. 5 is a perspective view of yet another embodiment of the disclosed device 10. As previously discussed, device 10 is not confined to any specific number of fluid storage tanks 14. Accordingly, FIG. 5 depicts a towed portable cleaning apparatus 10 that includes one storage chamber 14a for unused wash fluids and another storage chamber 14b for used wash fluids. Both storage chambers also additionally serve as the walls or barriers of an enclosed area 30. These containers 14a and b may contain a variety of wash fluids, including but not limited to, water and commercial solvents.

Figure 6:
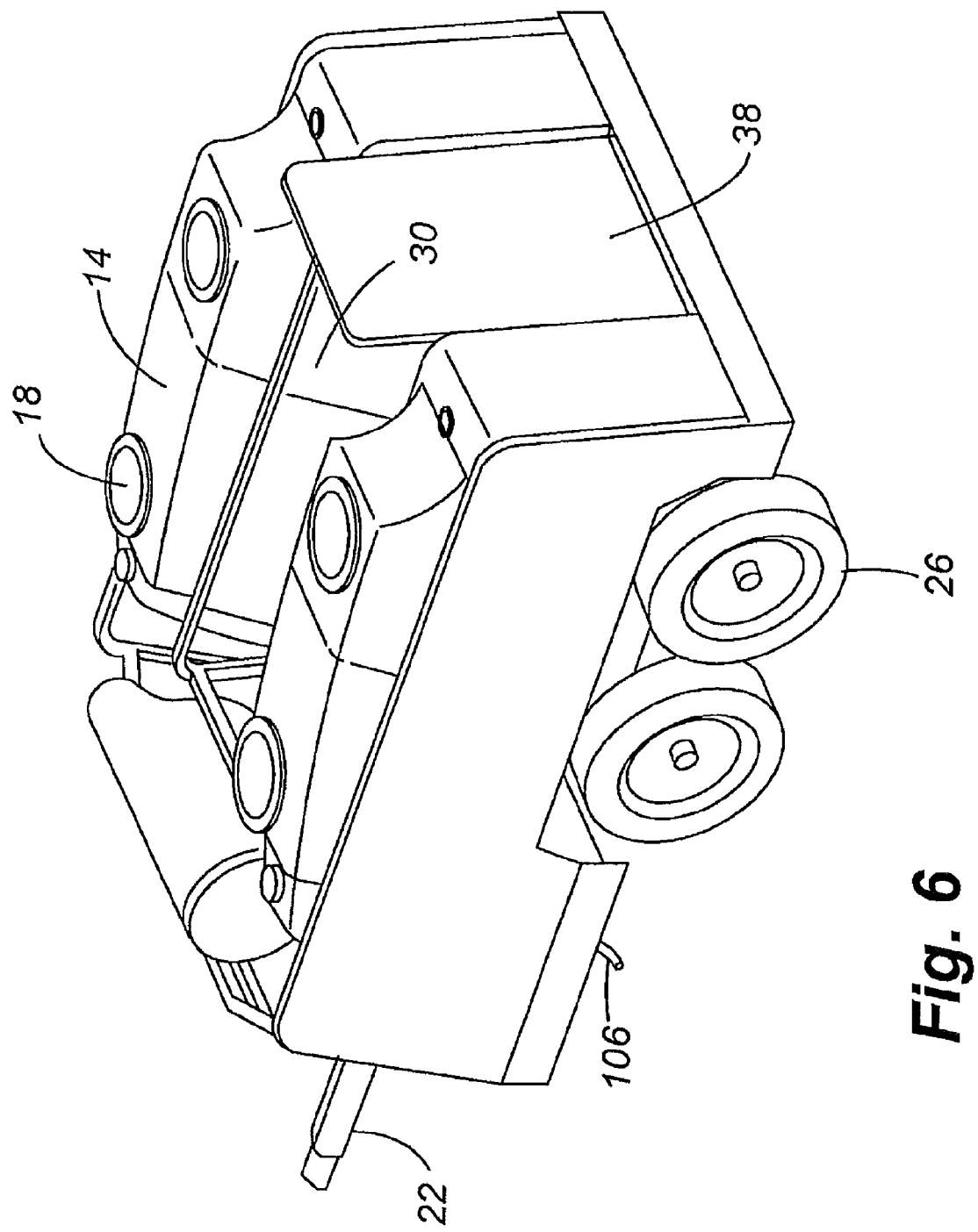
FIG. 6 is a perspective view of a towed portable cleaning apparatus and workstation depicting yet another embodiment of a disclosed device.

FIG. 6 is a perspective view of another embodiment of the device 10 where a door or enclosure 38 is included to further enclose the work enclosed area 30 at a point of entry. The device 10 offers a secure work enclosed area 30 within which items may be cleaned without excessive loss of working fluids or the resulting contamination of the surrounding environment. Accordingly, one embodiment of the disclosed device contemplates the use of a hingedly attached door 38 that can enclose a user within the work enclosed area 30. This door 38 may be hingedly attached along a base of the work enclosed area 30, thus allowing it to be deployed to further operate as a ramp when open and a wall or enclosure when closed.

The device further contemplates a door 38 which is hingedly attached along one or more vertical sides or along a top edge, or which is either comprised of one or more of the group including a sliding gate, a plurality of sliding gates, a fully removable panel, a flexible mat, fabric or rubber flap, a curtain, and an overhead door. The device may also include a covering or a roof to further contain cleaning operations and shield a user from various environmental conditions. The covering, for example, may be comprised of an extension of the previously disclosed tanks 14 or may comprise an attachment portion which is received by the device 10.

Figure 7:
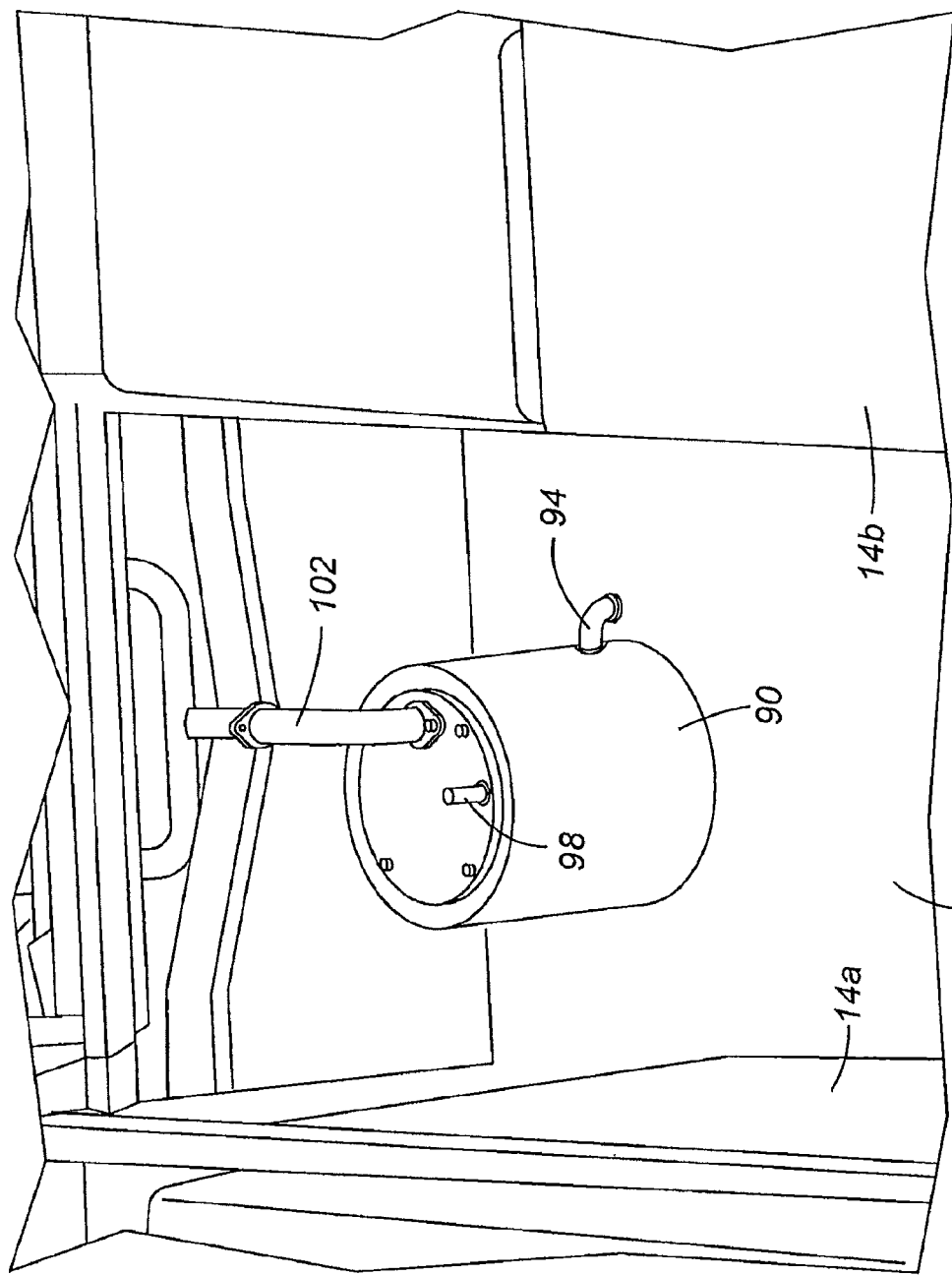
FIG. 7 is a perspective view of a towed portable cleaning apparatus with an integrated heat exchanger according to one embodiment of a disclosed device.

FIG. 7 is a perspective view of one embodiment of the present invention 10 wherein a heat exchanger 90 is employed to advantageously utilize heat emissions from the previously discussed engine 36 and pump 40 portion of the device 10. One of ordinary skill working in the art will recognize that it is often desirable to filter or cleanse flue gases and emissions from a hydrocarbon consuming engine before venting those gases to the environment. It will also be recognized that the purification and venting of these gases typically results in the sacrifice of substantial energy from the system in the form of heat. Accordingly, as described in U.S. patent application Ser. No. 12/730,066, a heat recovery device 90 is incorporated into a preferred embodiment of a towed portable cleaning apparatus 10.

Unused fluids, such as water, may be stored in a storage wall tank 14b and delivered to a heat recovery device 90 through an inlet 94. Delivery of the fluid from the storage area 14b to the heat recovery device 90 may be accomplished by any of the previously described methods and devices, including but not limited to gravity, hydrostatic pressure, or mechanical pumps. Once these fluids have been transported to the heat recovery device 90, it is allowed to interact with heat energy, as described in U.S. patent application Ser. No. 12/730,066, for example. That heat energy is delivered to the heat recovery device 90 from a gas inlet 102. The gas inlet 102 preferably transmits hot gases emitted from engine 36 to the heat recovery device 90, where that gas is generally exposed to fluid to be heated in a manner that allows for transfer of heat from the gases to the fluid in the form of conduction, convection, and/or radiation.

One of ordinary skill in the art will recognize that the gases and fluids need not be in direct contact with each other or be in any specific arrangement in order to achieve the objectives of the present invention. However, in a preferred embodiment, fluid is allowed to circulate through an outer portion of the heat recovery device 90 before being carried to a radiator situated within the device by a connection as described in U.S. patent application Ser. No. 12/730,066, for example. After being subjected to the heat recovery device 90, the fluid is made available through an outlet 98 from which it can be pumped or otherwise dispensed in cleaning operations.

Heat recovery device 90 may be used to pre-heat fluids before fluids are directed to additional heating devices and before being dispensed in cleaning operations. For example, fluids may be pre-heated in the heat recovery device 90 before being subjected to heating coils downstream of the heat recovery device 90. Alternatively, heat recovery device 90 may operate as the primary heating device for cleaning fluids.

After gases have been exposed to heat transfer and desired filtration (not shown), they are conveyed to the outside environment by an exhaust outlet 106 in FIG. 6. Through this process, cleaning fluids are advantageously heated and flue gas exhaust is vented at a safer temperature. It will be recognized that heating fluid(s) prior to use in cleaning offers the advantage of increased solubility of dirt and grime due to elevated kinetic energy of the fluid(s).

In a preferred embodiment, the heat recovery device 90 is located adjacent to or within the workspace of the present invention 10. Such an embodiment may further comprise housing or shielding around the heat recovery device. It will also be recognized that the heat recovery device 90 may be located in any desired location on the towed portable cleaning apparatus 10. As such, the device 10 is not limited to an embodiment wherein the heat recovery device is located within the enclosed area 30. Furthermore, where the heat recovery device 90 is located within the enclosed area 30, it will be recognized that arrangements may need to be made for the previously described drain 34. For example, where the heat recovery device 90 is located in a forward central location as shown in FIG. 7, the drain 34 may need to be positioned so that flow to the drain 34 is not impeded by the heat recovery device 90. Alternatively, in embodiments where cleaning operation will take place external to the disclosed device, it will be recognized that a drain or collection point need not be located on the enclosed area 30. In these and similar embodiments, heat recovery device 90 may take the place of drain 34.

Figure 8:
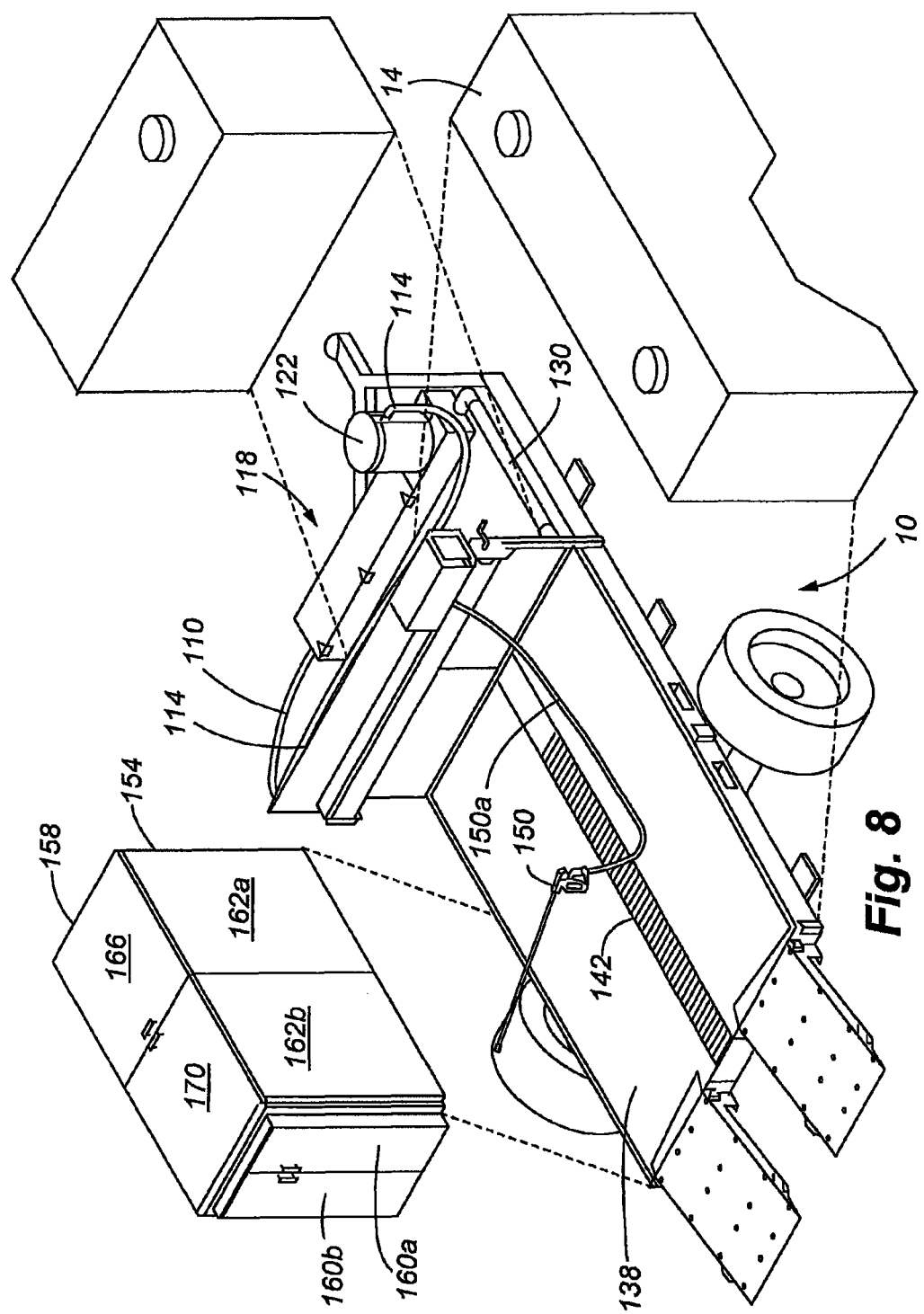
FIG. 8 is a perspective view of a wash fluid containment and treatment system according to a disclosed device.

FIG. 8 illustrates a combined system 10 for a wash water containment and treatment system incorporated in a towed portable cleaning apparatus. Various embodiments and features described in U.S. patent application Ser. No. 12/480,515, which is incorporated by reference herein, may be included in this system. The present invention contemplates the use of various features of application Ser. No. 12/480,515 described herein as incorporated on a trailer or towed device as shown in FIG. 8. The embodiment 10 includes a work area 138, a sump 118, and a water treatment system 154. An object to be washed may be positioned on the work area 138. As the object is washed, wastewater is directed inwardly by the sloped surfaces of the work area 138, collected via central trench 142, and then transferred via a hose or pipe 130 to the sump 118.

The water treatment system 154 includes an enclosure or cabinet 158 that houses/encloses various system components. The cabinet 158 may include: removable upper doors 166, 170; removable side panels 162a, 162b (two side panels on each lateral side); hinged front doors 160a, 160b; and removable rear panel(s).

According to one embodiment, the wastewater from the trench 142 passes via pipe 130 to the sump 118. The sump 118 comprises a sludge separator 122 and a holding tank including a weir (not shown). The wastewater from pipe 130 preferably passes over the weir in the holding tank, the weir capturing certain debris and heavy solids, and the wastewater thereafter is transferred to the treatment system 154 via hose 110. Recycled/treated water from the treatment system 154 may be immediately returned to the work area 138, or may be re-circulated through the treatment system. Sludge waste from the treatment system 154 is purged into the sludge separator 122 via hose 114.

Thus, according to the embodiment shown in FIG. 8, even before reaching the water treatment system 154, the wastewater has undergone various processes for removing debris and solids. A pumping apparatus of known configuration (not shown in FIG. 8) may also be provided to re-circulate the collected wastewater through subsequent processes, to send collected waste water immediately to the work area 138 for reuse as wash water (e.g. via hose 150*a* and pressure washer 150) without further treatment or may be sent to a holding tank, or may be sent to another appropriate system.

Various cleaning steps, including but not limited to those described in U.S. patent application Ser. No. 12/480,515 may be conducted within cabinet 158. At the conclusion of the cleaning steps, which may include subjecting wash water to various tortuous pathways, the resulting fluid is a recyclable fluid which may safely be pumped for reuse in cleaning operations. According to one alternative embodiment, the recyclable fluid may be pumped to another location, such as a storm sewer, a potable fluid supply, a watering system, a holding tank or even back to the treatment system.

Pumping means may be comprised of a number of different types of apparatus for distributing water throughout the system to permit continuous and immediate treatment and/or reuse of fluids collected by the system. By way of example but not limitation, pumping means may include small frame fluid pumps, medium frame fluid pumps, large frame fluid pumps, peristaltic pumps, reversible flow pumps, siphons such as gravity siphons, and sump pumps. Other pumping means are also contemplated for use with the present system and method.

While various embodiments of the disclosed device have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The foregoing discussion of the invention has been presented for purposes of illustration and description. The foregoing is not intended to limit the invention to the form or forms disclosed herein. In the foregoing description for example, various features of the invention have been identified. It should be appreciated that these features may be combined together into a single embodiment or in various other combinations as appropriate for the intended end use of the band. The dimensions of the component pieces may also vary, yet still be within the scope of the invention. This method of disclosure is not to be interpreted as reflecting an intention that the claimed invention requires more features than are expressly recited in each claim. Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation. Rather, as the following claims reflect, inventive aspects lie in less than all features of any single foregoing disclosed embodiment. Thus, the following claims are hereby incorporated into this Detailed Description, with each claim standing on its own as a separate preferred embodiment of the invention.

What is claimed is:

1. A portable cleaning station device, comprising:
 a platform having a top and bottom and a perimeter;
  towing means for selectively interconnecting the device to a vehicle;
  a plurality of fluid storage tanks positioned on the platform and at least partially enclosing a work-space;
  the work-space consisting essentially of an area enclosed on at least three sides by said plurality of fluid storage tanks, and a flooring surface;
  wherein the fluid storage tanks include one or more ports through which fluid can be added or removed; and
  wherein the fluid storage tanks comprise substantially vertical containment walls adjacent the works-space and at least partially enclose the work-space.

2. The portable cleaning station device of claim 1, further comprising pumping devices for transferring fluid.

3. The portable cleaning station device of claim 1, further comprising:
 a heat exchanger for use in a cleaning device comprising:
 a fluid jacket including a fluid inlet, a fluid outlet, an external housing and an internal housing having an internal surface and, wherein fluid entering the fluid jacket is in contact with at least a substantial portion of the internal surface of the internal housing;
 a primary heat exchanging device having a fluid inlet and a fluid outlet and substantially enclosed by the internal housing and creating a first and second chamber within the internal housing, and having a fluid inlet connected to a fluid outlet of the fluid jacket;
 an inlet for supplying heated gas to the first chamber; and
 an outlet for removing gas from the second chamber after that gas has passed through at least one of or around the primary heat exchanging device through the radiator.

4. The portable cleaning station device of claim 1, wherein said means for towing comprises a trailer tongue for selectively interconnecting the device to a vehicle.

5. The portable cleaning station device of claim 1, further including at least one hose reel fixedly attached to one of the plurality of tanks and the platform.

6. The portable cleaning station device of claim 1, further including a closing device adjacent to at least one of the plurality of tanks.

7. The portable cleaning station device of claim 1, wherein a spray-gun is attached to the end of a hose.

8. The portable cleaning station device of claim 1, further including one of a pump, engine, and a motor.

9. The portable cleaning station device of claim 8, further including a pump, an engine, and an automatic drive belt tensioning assembly.

10. The portable cleaning station device of claim 1, including a drain in the platform which directs spent fluid to a spent fluid holding tank.

11. The portable cleaning station device of claim 1, further including a spent fluid treatment system.

12. A portable cleaning station device, comprising:
a platform having a bottom and a perimeter;
a tank positioned on top of the platform and directly adjacent substantial portions of the perimeter of the platform;
a work-space provided on the platform at least partially defined by the tank, wherein the tank comprises at least one substantially vertical containment wall;
wherein the includes one or more ports through which fluid can be added or removed from the tank; and
a cabinet positioned on the top of the platform.

13. The portable cleaning station device of claim 12, further comprising at least one of wheels and means for towing the portable cleaning station.

14. The portable cleaning station device of claim 12, further including at least one hose reel fixedly attached to one of the plurality of tanks and the platform.

15. The portable cleaning station device of claim 12, further including a closing device adjacent to at least one of the plurality of tanks.

16. The portable cleaning station device of claim 12, wherein a spray-gun is attached to the end of a hose.

17. The portable cleaning station device of claim 12, further including one of a pump, engine, and a motor.

18. The portable cleaning station device of claim 17, further including a pump, an engine, and an automatic drive belt tensioning assembly.

19. The portable cleaning station device of claim 12, including a drain in the platform which directs spent fluid to a spent fluid holding tank.

20. The portable cleaning station device of claim 12, further including a spent fluid treatment system.

21. The portable cleaning station device of claim 12, wherein the cabinet comprises:
a self contained cleaning apparatus for continuously treating wastewater, comprising:
at least one inlet for collecting fluids expelled by a cleaning device;
at least one separation apparatus for separating solid contaminants from the fluids received by the at least one inlet;
a pump for transferring the fluids to a fluid treatment system;
transferring the fluids from the fluid treatment system to a clean fluid retention device;
wherein the inlet for collecting fluids captures substantially the entire volume of fluids expelled by the cleaning device and continuously transferring these fluids from the inlet, through the at least one separation apparatus, to the fluid treatment system and then to the clean fluid retention device.

22. The portable cleaning station device of claim 21 wherein the at least one inlet is comprised of a trough located in the flooring of a wash area assembly.

23. The portable cleaning station device of claim 21 wherein the pump is selected from the group consisting of a small frame pump, a medium frame fluid pump, a large frame fluid pump, a peristaltic pump, a reversible flow pump, a gravity siphon, and a sump pump.

24. The portable cleaning station device of claim 21 further comprising additional pumping devices for transferring fluid from the fluid treatment system to either the separation apparatus or back to the fluid treatment system for additional treatment cycling.

25. The portable cleaning station device of claim 21 further comprising a second pump for recirculating fluid from the fluid treatment system to at least one sump system for separating remaining solid contaminants from the collected fluids.

26. The portable cleaning station device of claim 21, further comprising:
a system for fluid treatment and recirculation, comprising substantially continuously collecting wastewater produced by the system;
a first, second and third fluid treatment compartment disposed in a single cabinet enclosure, the first fluid treatment compartment being connected to an outlet of a solid contaminants separation system, the inlet of the second fluid treatment compartment being connected to an outlet of the first fluid treatment compartment, and the inlet of the third fluid treatment compartment being connected to an outlet of the second fluid treatment compartment;
substantially continuously transferring collected wastewater to at least one of the first, second and third fluid treatment compartments;
wherein the first, second and third fluid treatment compartments consecutively separate particulates from the fluid as the fluid travels through the fluid treatment system; and
wherein the first, second and third water treatment compartments are each operably associated with at least one pump for distributing fluid to either:
(a) the first, second or third fluid treatment compartments;
(b) the solid contaminants separation system; or
(c) a holding device.

27. The portable cleaning station device of claim 12, further comprising:
a heat exchanger for use in a cleaning device comprising:
a fluid jacket including a fluid inlet, a fluid outlet, an external housing and an internal housing having an internal surface and, wherein fluid entering the fluid jacket is in contact with at least a substantial portion of the internal surface of the internal housing;
a primary heat exchanging device having a fluid inlet and a fluid outlet and substantially enclosed by the internal housing and creating a first and second chamber within the internal housing, and having a fluid inlet connected to a fluid outlet of the fluid jacket;
an inlet for supplying heated gas to the first chamber; and
an outlet for removing gas from the second chamber after that gas has passed through at least one of or around the primary heat exchanging device through the radiator.

28. A portable cleaning station device, comprising:
a platform having a top and bottom and a perimeter;
a tank positioned on top of the platform comprising substantially vertical containment walls directly adjacent substantial portions of the perimeter of the platform and the tank includes one or more ports through which fluid can be added or removed from the tank and at least partially enclose an cleaning area located on the top of the platform;

a heat exchanger comprising a fluid inlet and fluid outlet for providing hot liquid; and a cabinet positioned on top of the platform and directly adjacent portions of the perimeter of the platform wherein the cabinet includes one or more inlets and at least partially enclosing the cleaning area.

29. The portable cleaning station device of claim 28, further comprising at least one of wheels and means for towing the portable cleaning station.

30. The portable cleaning station device of claim 28, further including at least one hose reel fixedly attached to one of the plurality of tanks and the platform.

31. The portable cleaning station device of claim 28, further including a closing device adjacent to at least one of the plurality of tanks.

32. The portable cleaning station device of claim 28, wherein a spray-gun is attached to the end of a hose.

33. The portable cleaning station device of claim 28, further including one of a pump, engine, and a motor.

34. The portable cleaning station device of claim 28, further including a pump, an engine, and an automatic drive belt tensioning assembly.

35. The portable cleaning station device of claim 28, including a drain in the platform which directs spent fluid to a spent fluid holding tank.

36. The portable cleaning station device of claim 28, further including a spent fluid treatment system.

37. The portable cleaning station device of claim 28, wherein the platform comprises:

a self contained cleaning apparatus for continuously treating wastewater, comprising:

at least one inlet for collecting fluids expelled by a cleaning device;

at least one separation apparatus for separating solid contaminants from the fluids received by the at least one inlet;

a pump for transferring the fluids to a fluid treatment system;

transferring the fluids from the fluid treatment system to a clean fluid retention device;

wherein the inlet for collecting fluids captures substantially the entire volume of fluids expelled by the cleaning device and continuously transferring these fluids from the inlet, through the at least one separation apparatus, to the fluid treatment system and then to the clean fluid retention device.

38. The portable cleaning station device of claim 37, wherein the at least one inlet is comprised of a trough located in the flooring of a wash area assembly.

39. The portable cleaning station device of claim 37, wherein the pump is selected from the group consisting of a small frame pump, a medium frame fluid pump, a large frame fluid pump, a peristaltic pump, a reversible flow pump, a gravity siphon, and a sump pump.

40. The portable cleaning station device of claim 37, further comprising additional pumping devices for transferring fluid from the fluid treatment system to either the separation apparatus or back to the fluid treatment system for additional treatment cycling.

41. The portable cleaning station device of claim 37, further comprising a second pump for recirculating fluid from the fluid treatment system to at least one sump system for separating remaining solid contaminants from the collected fluids.

42. The portable cleaning station device of claim 28, further comprising:

a system for fluid treatment and recirculation, comprising substantially continuously collecting wastewater produced by the system;

a first, second and third fluid treatment compartment disposed in a single cabinet enclosure, the first fluid treatment compartment being connected to an outlet of a solid contaminants separation system, the inlet of the second fluid treatment compartment being connected to an outlet of the first fluid treatment compartment, and the inlet of the third fluid treatment compartment being connected to an outlet of the second fluid treatment compartment;

substantially continuously transferring collected wastewater to at least one of the first, second and third fluid treatment compartments;

wherein the first, second and third fluid treatment compartments consecutively separate particulates from the fluid as the fluid travels through the fluid treatment system; and wherein the first, second and third water treatment compartments are each operably associated with at least one pump for distributing fluid to either:

(d) the first, second or third fluid treatment compartments;

(e) the solid contaminants separation system; or (f) a holding device.

43. The portable cleaning station device of claim 28, further comprising:

a heat exchanger for use in a cleaning device comprising:

a fluid jacket including a fluid inlet, a fluid outlet, an external housing and an internal housing having an internal surface and, wherein fluid entering the fluid jacket is in contact with at least a substantial portion of the internal surface of the internal housing;

a primary heat exchanging device having a fluid inlet and a fluid outlet and substantially enclosed by the internal housing and creating a first and second chamber within the internal housing, and having a fluid inlet connected to a fluid outlet of the fluid jacket;

an inlet for supplying heated gas to the first chamber; and an outlet for removing gas from the second chamber after that gas has passed through at least one of or around the primary heat exchanging device through the radiator.

* * * * *